United States Patent [19]

Lemoussu

[11] 4,009,341

[45] Feb. 22, 1977

[54] DEVICE FOR REGENERATING TELEGRAPHIC SIGNALS

[75] Inventor: Michel Lemoussu, Palaiseau, France

[73] Assignee: Compagnie Industrielle des Telecommunications Cit-Alcatel, Paris, France

[22] Filed: May 9, 1975

[21] Appl. No.: 576,239

[30] Foreign Application Priority Data

May 27, 1974  France .............................. 74.18283

[52] U.S. Cl. .............................. 178/69 A; 328/162
[51] Int. Cl.² .......................................... H04L 25/02
[58] Field of Search ...................... 178/69 R, 69 A; 328/162, 163, 164; 235/61.11 E; 179/99

[56] References Cited

UNITED STATES PATENTS

| 3,604,941 | 9/1971  | Crum .......................... 235/61.11 E |
| 3,766,325 | 10/1973 | Hatfield et al. ...................... 179/99 |
| 3,840,753 | 10/1974 | Kuo .................................. 328/162 |

Primary Examiner—Thomas A. Robinson

[57] ABSTRACT

A device for regenerating telegraphic signals without bias distortion and noise, using, essentially, a peak limiter fed with direct current voltage from the input signal and a comparator comparing the output signal leaving the peak limiter with a decision potential. The device is used in a telegraphic connection, at the end of a subscriber cable coming from a telephone terminal.

5 Claims, 7 Drawing Figures

DEVICE FOR REGENERATING TELEGRAPHIC SIGNALS

The invention relates to a device for regenerating telegraphic signals which ensures almost complete elimination of bias distortion, as well as an excellent protection against noise signals.

By bias distortion is meant the deformation of telegraphic signals emitted by a subscriber in the form of rectangular pulses having a determined duration (telegraphic moment M) under the effect of capacitors distributed along the transmission line to a distant receiver situated in an exchange, for example a subscriber cable.

Referring to FIGS. 1a, 1b, 1c, which relate to the known transmission of telegraphic signals, it will be observed that the signals $i$ (FIG. 1a) emitted in the form of rectangular pulses with upper peaks (current + I) and lower peaks (current − I), reach the exchange (FIG. 1b) in the form of a signal Ve constituted by a succession of segments having an exponential form, with an amplitude of +Ve to −Ve. If, to regenerate, for example, the positive pulse, the curve is chopped by a threshold value Vo to produce a generated rectangular pulse (FIG. 1c) the duration of the moment obtained is M′<M M′ is taken as equal to M−D. The bias distortion is defined by $d=D/M$.

To reduce this bias distortion as much as possible, it becomes necessary to impart to the threshold Vo a value which is as near as possible to zero: in such case, the moment M′ becomes almost equal to the moment M, defined as the interval between two passes of the deformed curve through zero (points $m$ and $m'$, FIG. 1b).

However, that system of correction of the bias distortion has the disadvantage of being very sensitive to noise signals since in principle, even very weak signals exceed the threshold. There is therefore apparently an incompatibility between low distortion which requires a low threshold and great immunity to noise which requires a high threshold. When a relatively high value is imparted to the threshold Vo (FIG. 1b) good protection is provided against interference pulses, but bias distortion is caused in the regenerated signals. Certain known circuits adopt such a high threshold determining the transitions and provide means for compensating the bias distortion which is produced so that the duration of a regenerated pulse is substantially equal to the input pulse. A regenerated pulse which is shifted to relation to the input pulse is then obtained.

The means for compensating the bias distortion consists essentially of a capacitor connected to the input of a threshold comparator, receiving the signal to be regenerated. This capacitor becomes charged, from the crossing of the threshold Vo, during the portions of increasing arcs of the telegraphic input signal, that is, between Vo and Ve (FIG. 1b). It becomes discharged from the beginning of the portions of decreasing arcs, that is, from Ve to Vo, having a high time constant, setting up an additional current applied to the input of the comparator receiving the signal to be regenerated, to shift the instant of transition on the crossing of the threshold Vo, by modification of the slope of the portions of decreasing arcs.

To provide regenerated telegraphic signals practically without bias distortion, which there is therefore no need to compensate, and at the same time, to ensure good protection against noise, the invention uses the combination of three processes:

1. Applying the input signal to a first differential amplifier of a high-gain comparator, operating as a double O + ε peak limiter, where ε is of the order of a few millivolts;

2. Feeding the differential amplifier with a direct-current voltage extracted from the input signal itself, the output signal of the amplifier having an amplitude which is an increasing function of the amplitude of the input signal, despite the effect of the peak limiting;

3. Applying the signal to a second amplifier-comparator which causes a change of its output potential if it receives from the first amplifier a voltage signal which crosses a predetermined decision potential VD and causes no change in the contrary case.

Therefore, if the input signal is greater than a certain threshold, the second amplifier-comparator regenerates the telegraphic signals practically without bias distortion; below that threshold, the input signal will leave the output of the second comparator at a constant level.

Moreover, to ensure galvanic isolation between the currents flowing in the telegraph line and the battery feeding the signal regenerating circuit, the invention provides means for transmitting the single-pole output signal of the first amplifier to the input of the second amplifier-comparator without galvanic connection, i.e. without connection wires.

The invention will be described in detail with respect to one embodiment, with reference to the accompanying drawing, in which:

FIGS. 1a, 1b, 1c have been described in the introduction to give the definition of bias distortion;

Figure 1A:
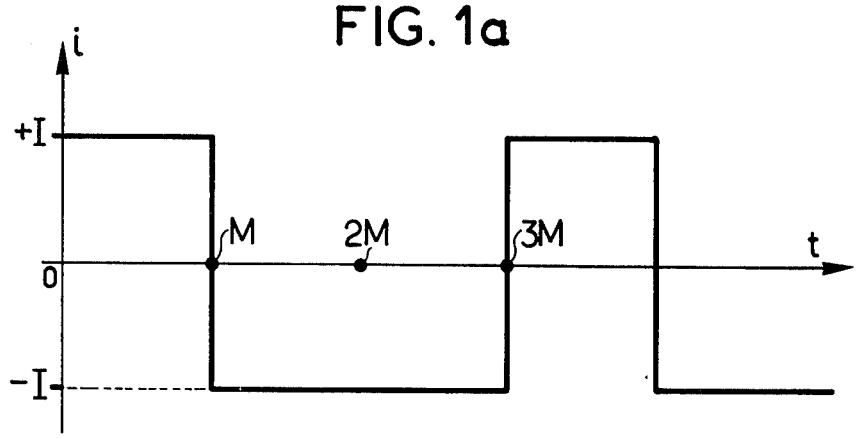
Figure 1B:
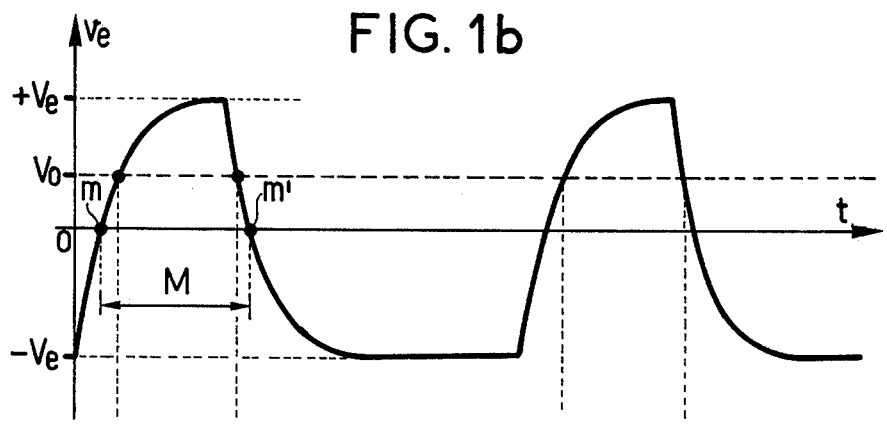
Figure 1C:
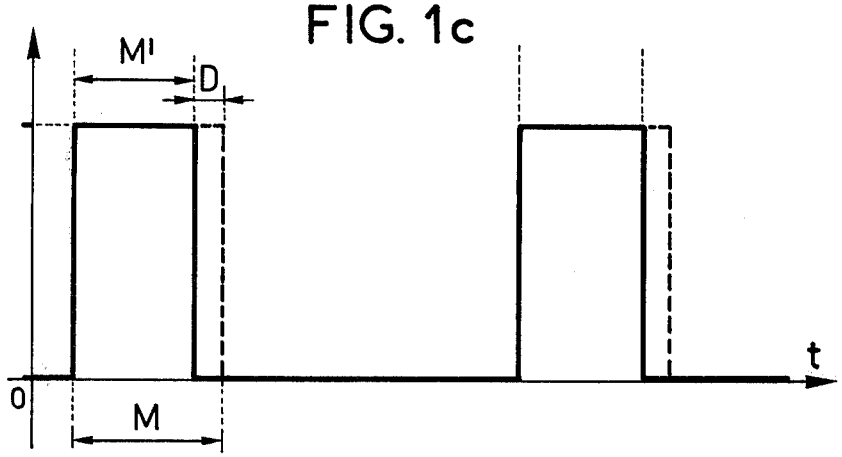
Figure 2:
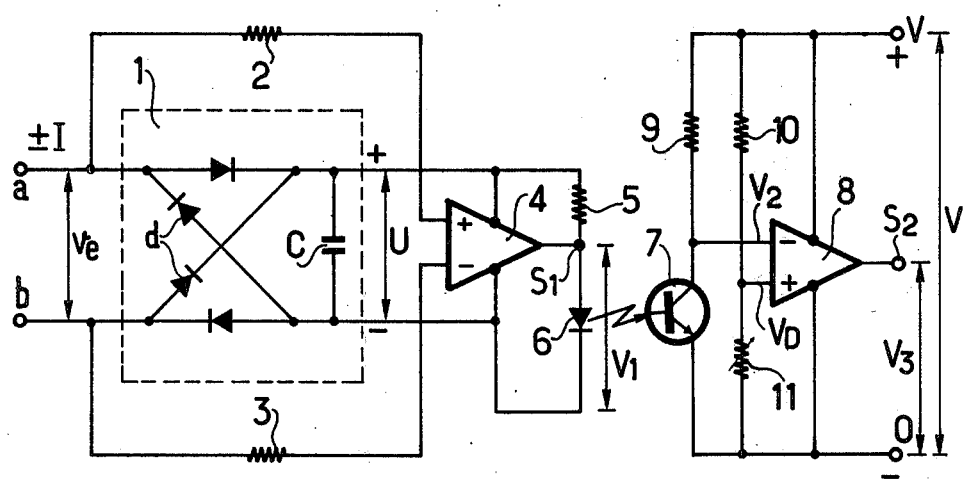
FIG. 2 is a circuit diagram of the device according to the invention.

In FIG. 2, a telegraphic signal, for example, having two levels of current ± I, comes from a telegraphic line (not shown) to terminals $a$, $b$, between which it sets up a potenial difference Ve. The voltage ± Ve, which assumes alternatively the two polarities, in correspondence with the two polarities of the current I, is rectified in a current feed circuit 1, comprising, for example, a bridge type rectifier having four diodes $d$ and a smoothing capacitor C, which supplies a direct current voltage U having a constant polarity and an amplitude proportional to the amplitude Ve of the input signal $ve$. The direct current voltage has a quasi-constant amplitude for a constant amplitude Ve of the input signal. The voltage U is used for feeding a differential amplifier 4 having a great gain, for example of the order of $10^5$, of the comparator type, operating as a peak limiter with a peak limiting level of ± ε.

The signal $ve$ is applied between the ± and − terminals of the amplifier 4 through resistors 2 and 3 respectively, to reduce its amplitude Ve, which, is normally of the order of ± 20 volts. The point S1, which is the output of the amplifier 4, having a potential of V1 in relation to the negative terminal of the current feed circuit U is connected, on the one hand, to an electroluminescent diode 6, which is connected to the negative terminal of the current feed circuit U and, on the other hand, to a resistor 5, is connected to the positive terminal of the current feed circuit U.

The electroluminescent diode 6 is connected to a photo-transistor 7 to form a photo-coupler which is used for transferring, without galvanic connection, the unipolar output signal of the amplifier 4 to the input of a second amplifier-comparator 8.

The amplifier-comparator 8 is fed by a battery, not shown, at voltage of +V, the photo-coupler (6,7) ensuring a galvanic separation with the telegraphic input line and the amplifier 4.

The photo-transistor 7 has its emitter connected to the negative terminal of the current feed circuit V, set to zero volts, and its collector set to the voltage V2 by a resistor 9 which connects it to the line ±V. The collector of the photo-transistor 7 is connected to the negative input of the comparator 8. The positive input of the amplifier-comparator 8 is brought to a predetermined potential $V_D$, called the decision potential, by a voltage divider comprising a fixed resistor 10 and a variable resistor 11 installed between the + V and O lines.

A voltage V3 of rectangular pulses, which varies between O and +V if the input signal ve exceeds a certain threshold Vo, or remains equal to O in the contrary case, is obtained at the output S2 of the comparator 8.

The operation will be described with reference to FIGS. 3a, 3b, 3c.

Figure 3A:
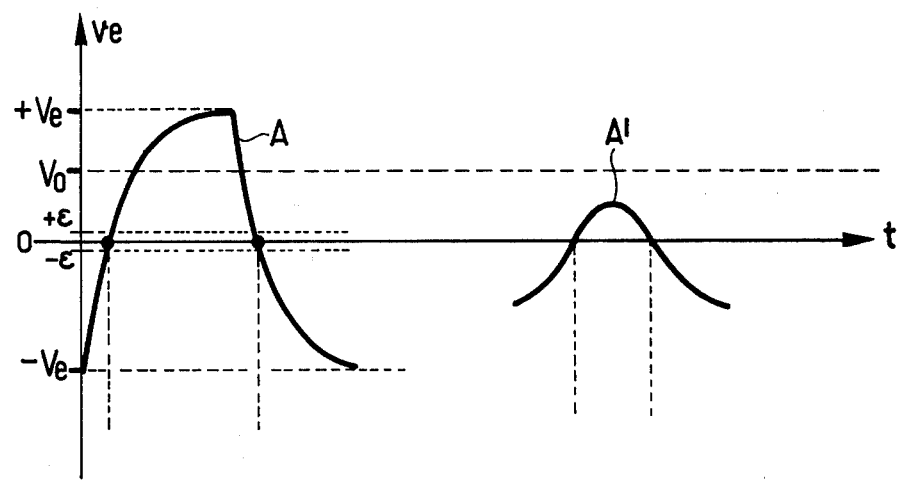
FIGS. 3a, 3b, 3c, show the variations of signals given by the device in FIG. 2.

FIG. 3a shows at the left-hand part, a normal telegraphic input signal, A, exceeding a threshold Vo. It is regenerated by crossing the peak limiting levels ± ε( εδ1 millivolt).

The right-hand part shows a noise pulse A' having an amplitude lower than the threshold Vo. It is also transformed into a pulse on crossing the ordinates ± ε.

Figure 3B:
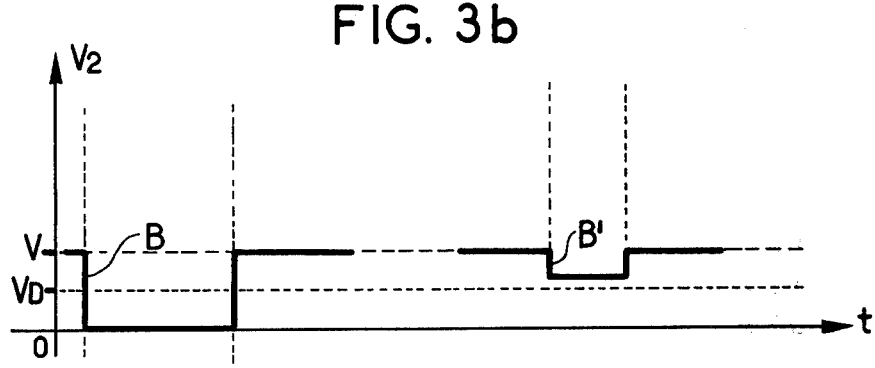

FIG. 3b shows the variations in the voltage V2 corresponding to each of the two input signals A and A'. $V_D$ is the decision potential.

With respect to the telegraphic signal, V2 assumes the form of a regenerated pulse B crossing the decision potential $V_D$.

With respect to the noise signal, V2 also assumes the form of a gate pulse B', but does not cross the decision threshold $V_D$.

Figure 3C:
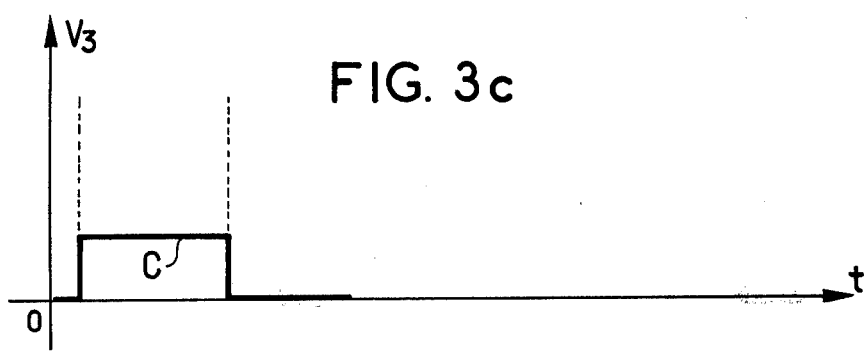

FIG. 3c shows the variations of the output voltage V3 at S2.

The pulse B causes a change of the amplifier-comparator 8; the regenerated telegraphic signal C is obtained at S2.

On the other hand, the pulse B' does not cause any change at the output of the amplifier-comparator 8. Despite the peak-limiting which the noise signal undergoes, it does not provide any signal at S2.

These various processes will be described with reference to a numerical example by way of illustration.

Taking a telegraphic input signal ve having a maximum value ± Ve of ± 20 volts which is a usual value, the supply voltage U will be of the order of 18 volts. The resistor 5 has, for example, a value of 2000 ohms.

The amplifier-comparator 4 having a hign gain produces at its output S1 a signal which varies according to the level of the signal ve applied to its inputs. When the signal ve passes from the level +ε to the level − ε, the output S1 of the amplifier 4, taken in comparision with the negative terminal of its current feed circuit U, is at a level close to 0 volts. In these conditions, the voltage at S1 is not sufficient to polarize the diode 6: the diode does not light up. As the diode 6 does not light up, the transistor 7 is blocked; the potential V2 is equal to +V, for example 12 volts.

At the time of the passing of the signal ve from the level −ε to the level +ε, the output S1 of the amplifier 4, taken in comparison with the negative terminal of its current feed circuit U, becomes positive. The voltage at the point S1 is adjusted at the threshold voltage of the diode 6, that is of the order of 0.7 volts. A current is set up in the diode 6, which current in the diode 6 is then equal to (18 − 0.7)/2000 = 8.65 mA. At the lighting up level provided by the electroluminescent diode 6 for such a current, the phototransistor 7 is saturated. The voltage V2 is then close to zero volts.

If it is assumed that the decision potential $V_D$ has been fixed at 6 volts, the output voltage V3 will change value, for example from 0 to +V or vice-versa at each crossing of the potenial VD by the voltage V2 in one direction or the other: the regenerated telegraph signals are obtained at S2.

In this circuitry, it will be seen that it is the voltage at the terminals of the resistor 5, which here defines the value of the current which is set up in the diode 6 when the latter is suitably polarized; which defines the voltage V2 applied to the decision circuit 8. This voltage at the terminals of the resistor 5 is variable with the amplitude Ve of the input signal ve: it constitutes a unipolar signal from which the regenerating of the telegraphic signals is ensured.

Let it be assumed that the input signal ve is a noise signal having a maximum value of ± 10 volts. In this case, the supply voltage U assumes a value close to 8 volts, on account of a quasi-constant voltage drop, of the order of 2 volts, provided by the diode type rectifer circuit. The maximum current in the electroluminescent diode 6 is then of the order of 3.65 mA. It is deduced therefrom that the voltage drop in the resistor 9, which varies just about in proportion to the current in the diode 6, is of the order of 5 volts. The potential V2 is then equal to 7 volts. It varies therefore between 12 and 7 volts. The decision voltage, which is 6 volts, is not crossed: the output voltage V3 remains constant, equal to zero volts.

The threshold Vo of the amplitude Ve of the input signals ve below which the potential V2 no longer crosses the decision voltage $V_D$ is of the order of 10 volts.

It is possible to obtain immunity from noise greater than Vo when the noise which appears at the terminals a, b, are noise pulses. Indeed, if the terminals a, b, receive pulses whose duration is sufficiently short, the energy supplied by the rectifier bridge 1 will be slight so that the current crossing the electroluminescent diode 6 will be insufficient to cause the crossing of $V_D$. This property is an advantage for when a cut occurs in a telegraph line, pulses which are differentiated due to the cross-talk with the other pairs of the cable in which telegraphic currents also, flow can appear in the cut channel. By means of the device according to the invention, interference signals of that kind have no influence despite their great peak amplitude.

Another advantage of the invention is that contrary to certain known applications of the photo-coupler to telegraphic transmission, the current through the electroluminescent diode is not equal to the current in the line, (usually equal to 20 mA) but to a much lower value 8.65 mA in the above-mentioned example). This is an advantage due to the fact that the emitting power of electroluminescent diodes decreases in time and all the faster as the density of the current which crosses through them is higher.

The invention is not limited to the embodiment described above. Various modifications can be made thereto without going beyond the scope thereof as defined in the appended claims.

More particularly, the transmitting of the unipolar signal without galvanic connection between the first amplifier and the second amplifier can be ensured by a known circuitry comprising an oscillator energizing a transformer whose secondary contains a rectifier circuit. The photo-transistor can be replaced by any other photosensitive component (photo-diode, photoelectric cell).

I claim:

1. A device for regenerating telegraphic signals free of bias distortion, noise, and interference signals, said device comprising an input circuit receiving telegraphic signals to be regenerated, an output circuit comprising a decision circuit including an amplifier-comparator having a threshold decision level, said output circuit having an output with regenerated telegraphic signals produced thereat, means for coupling the input circuit and the output circuit, said input circuit including an amplifier-peak limiter receiving the telegraphic signals and effecting peak-limiting at a level close to zero, means for feeding said limiter with direct current voltage obtained from rectified incident telegraphic signals, said limiter having an output connected to the coupling means and at which a unipolar signal is produced which is a function of the amplitude of the telegraphic signals.

2. A device as claimed in claim 1 wherein said limiter has feed terminals for the direct current voltage, a resistor connected between the output of the limiter and one feed terminal, said coupling means including a transmitter element connected between said output of the limiter and the other feed terminal.

3. A device as claimed in claim 2 wherein said coupling means further comprises a receiver coupled to said output means and operated by said transmitter without wired connections thereto.

4. A device as claimed in claim 3 wherein said transmitter is an electroluminescent diode and said receiver is a photosensitive element.

5. A device as claimed in claim 4 wherein said limiter comprises a differential amplifier connected by said resistor to its positive feed terminal and by said electroluminescent diode to its negative feed terminal, said unipolar signal being fed to the electroluminescent diode and thereby defining the signal fed to the amplifier comparator of said output circuit via said photosensitive element.

* * * * *